US007724687B2

(12) United States Patent
Autret et al.

(10) Patent No.: US 7,724,687 B2
(45) Date of Patent: May 25, 2010

(54) METHOD FOR TRANSMITTING INFORMATION BETWEEN BIDIRECTIONAL OBJECTS

(75) Inventors: Capucine Autret, Marnaz (FR); Jean-Michel Orsat, Chatillon-sur-Cluses (FR); Florent Pellarin, Annecy (FR)

(73) Assignee: Somfy SAS, Cluses (FR)

( * ) Notice: Subject to any disclaimer, the term of this patent is extended or adjusted under 35 U.S.C. 154(b) by 167 days.

(21) Appl. No.: 11/102,387

(22) Filed: Apr. 8, 2005

(65) Prior Publication Data

US 2005/0237957 A1 Oct. 27, 2005

(30) Foreign Application Priority Data

Apr. 16, 2004 (FR) .................................. 04 03993

(51) Int. Cl.
*H04L 12/28* (2006.01)

(52) U.S. Cl. .................... 370/255; 340/539.14; 340/5.8

(58) Field of Classification Search ................. 370/255, 370/310; 340/5.1, 5.8, 5.81, 5.85, 505, 539.1, 340/539.14, 539.16, 539.17, 539.22
See application file for complete search history.

(56) References Cited

U.S. PATENT DOCUMENTS

| | | | | |
|---|---|---|---|---|
| 4,529,980 | A | 7/1985 | Liotine et al. | |
| 4,652,860 | A | 3/1987 | Weishaupt et al. | |
| 4,988,992 | A | 1/1991 | Heitschel et al. | |
| 5,148,159 | A | 9/1992 | Clark et al. | |
| 5,237,319 | A | 8/1993 | Hidaka et al. | |
| 5,563,600 | A | 10/1996 | Miyake | |
| 5,742,236 | A | 4/1998 | Cremers et al. | |
| 6,137,884 | A | 10/2000 | Micali | |
| 6,888,850 | B2 * | 5/2005 | Perini et al. | 370/486 |
| 6,993,323 | B2 * | 1/2006 | Kamma | 455/411 |
| 7,102,502 | B2 * | 9/2006 | Autret | 340/505 |
| 7,185,199 | B2 * | 2/2007 | Balfanz et al. | 713/168 |
| 2002/0046349 | A1 * | 4/2002 | Saito | 713/201 |
| 2002/0049904 | A1 | 4/2002 | Nowottnick et al. | |
| 2003/0065805 | A1 * | 4/2003 | Barnes, Jr. | 709/231 |
| 2003/0086571 | A1 | 5/2003 | Audebert et al. | |

(Continued)

FOREIGN PATENT DOCUMENTS

DE 33 32 667 A1 3/1984

(Continued)

OTHER PUBLICATIONS

English translation of abstract of FR 2 847 060.

*Primary Examiner*—Edward Urban
*Assistant Examiner*—Christian A Hannon
(74) *Attorney, Agent, or Firm*—Husch Blackwell Sanders Welsh & Katz

(57) ABSTRACT

Secure transfer of information between a first command transmitter and a second command transmitter such as those employed for remote control of actuators employed in home automation systems for example for opening and closing windows, solar protection, ventilation, roller blinds, garage doors and the like, is achieved by first authenticating the first command transmitter with respect to a third object preferably constituting part of the existing network, such as a command receiver or command transmitter and only transferring information to the second command transmitter when authentication of the first command transmitter has succeeded. The method particularly applies when a new second command transmitter is to be installed on a home automation network, having identical rights and functionalities to those of the existing first command transmitter.

11 Claims, 4 Drawing Sheets

U.S. PATENT DOCUMENTS

| | | | | |
|---|---|---|---|---|
| 2003/0125057 | A1* | 7/2003 | Pesola | 455/502 |
| 2003/0151513 | A1* | 8/2003 | Herrmann et al. | 340/573.1 |
| 2003/0214955 | A1* | 11/2003 | Kim | 370/400 |
| 2004/0249922 | A1* | 12/2004 | Hackman et al. | 709/223 |
| 2004/0267909 | A1* | 12/2004 | Autret | 709/220 |
| 2005/0009498 | A1* | 1/2005 | Ho et al. | 455/402 |
| 2005/0088275 | A1* | 4/2005 | Valoteau et al. | 340/3.1 |

FOREIGN PATENT DOCUMENTS

| | | | |
|---|---|---|---|
| DE | 196 25 588 | A1 | 1/1998 |
| EP | 0 651 119 | A1 | 5/1995 |
| EP | 0 651 119 | B1 | 6/1996 |
| EP | 0 808 972 | A2 | 11/1997 |
| EP | 0 808 972 | A3 | 11/1997 |
| EP | 1 085 481 | A2 | 3/2001 |
| FR | 2 842 237 | | 1/2004 |
| FR | 2 847 060 | | 5/2004 |
| WO | WO 97/25502 | | 7/1997 |
| WO | WO 99/60530 | | 11/1999 |
| WO | WO 02/31778 | A1 | 4/2002 |
| WO | WO 02/47038 | A1 | 6/2002 |
| WO | WO 03/081352 | A2 | 10/2003 |

* cited by examiner

Figure 4
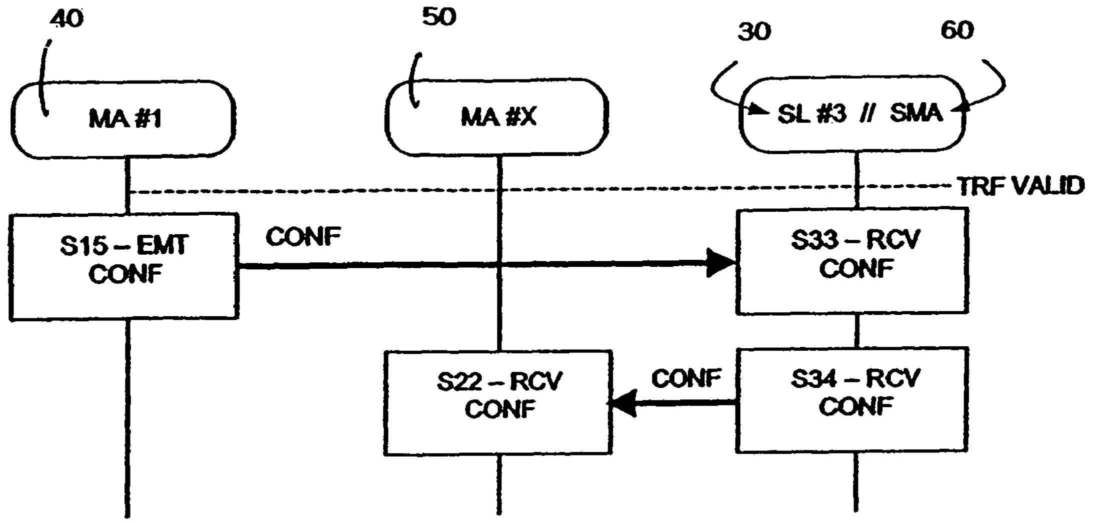
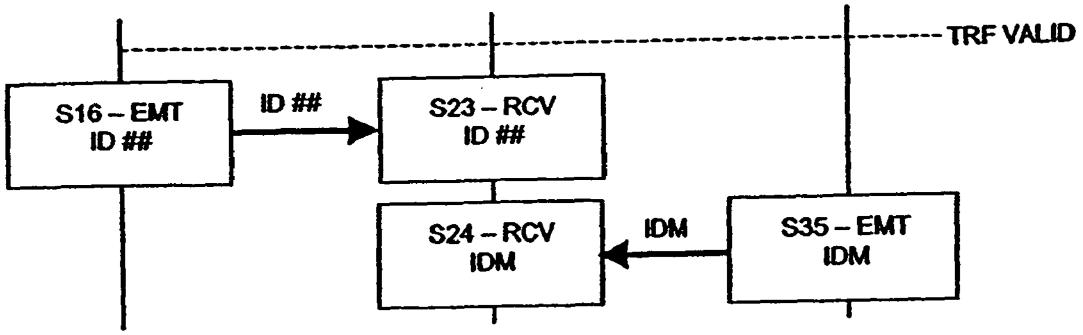
Figure 5

METHOD FOR TRANSMITTING INFORMATION BETWEEN BIDIRECTIONAL OBJECTS

FIELD OF THE INVENTION

The present invention relates to the field of actuator remote-control and notably wireless control of actuators employed in home automation systems providing comfort and security in buildings, for example for lighting, opening and closing windows, solar protection, ventilation and air conditioning systems, and so on.

BACKGROUND

In the current design of such systems, such actuators and/or associated sensors forming command receivers or slave units, are remotely controlled by control units or command points forming command transmitting stations or master units; nevertheless, actuators or sensors and control units are capable of communicating just as well in send as well as in receive mode via a two-way link, typically a radio link. We can then qualify generically such actuators or sensors or control units as "bidirectional objects". Direct radio frequency communication is also possible between two command transmitting points, as well as between two command receivers. Each element is viewed as a point or a node on the communication network thus constituted. Actuators or sensors are frequently located in areas difficult to access by the installer and even more so by the user.

Control points are one-way or two-way, mobile or fixed. Frequently, a fixed control point is itself battery-powered, which avoids wiring. When a control point is fitted with a transceiver, the receive function may only be activated upon command or intermittently, to limit power consumption.

Matching makes it possible to associate a common identifier to a pair formed by an actuator and a control point. The fact of sharing a common identifier then makes it possible for the actuator to recognize commands originating from the control point in order to respond thereto. Matching can be duplicated in order to control several actuators from a single control point or yet again to get a single actuator to respond to several control points.

In view of the existence of actuators for elements having a closing or locking function it is important for communication between command issuing and receiving points to be authenticated. Each element in the network carries an identifier which is specific to it, plus an identifier specific to the installation, called the "house key" or common key. A description of such a system can be found in International application WO-A-02 47038 or in applicant's International application WO-A-03 081352.

A command issuing point also contains the list of identifiers of several command receivers with which it is matched, in other words to which it is authorized to issue commands, and which are ready to execute such commands. For the sake of simplicity, we shall consider here that the list of identifiers carries all information concerning the control of a particular command receiver by a particular command transmitter. This can consequently also involve an encryption key specific to this pair of elements or any confidential data useful for transmission or execution of a command.

To make it easy for several users to make use of units remote-controlled by command receivers without having to again go through a whole series of individual matching operations, it is necessary to be able to transfer all or part of confidential information (house key, list of identifiers, etc) from a command transmitter already forming part of the network to a new command transmitter.

The prior art discloses various means for direct duplication between command transmitters.

U.S. Pat. No. 4,652,860 discloses a mode of transferring information for remote controls for automobile door opening. Communication between control points is for example by infra-red and over very short distances (control points side-by-side). Transfer is consequently made secure without a hacker some distance away being able to get at the information transmitted and then duplicate it in an identical command transmitter specific to him, without the authorized user being aware. Nevertheless, this solution is costly as it involves communication means that are specific to this single phase of duplicating from one command transmitter to another.

Where it is desired to be able to economically employ one single radio frequency communication means for transferring confidential information or for sending commands to command receivers, it is appropriate to take measures against the danger of the information being received by an ill-intentioned third party. The reception of confidential information at the precise moment where it is being transferred is however infinitely improbable except where a highly sophisticated piece of recording equipment has been hidden within range over a long period of time to collect all the information transmitted over a communication network. Duplication of the information from an old remote-control to a new one is indeed a rare event. Loss or theft of a remote control is, on the contrary, an event which is much more frequent.

International application WO-A-030 81352 proposes reducing the consequences of such violation of security by a procedure for modifying the house key, but this is a remedy and not a preventive measure.

This remedy is nevertheless effective and simple to perform provided loss or theft are quickly detected by the owner of the premises. Knowing this latter fact, a burglar who had managed to hide a command transmitter giving access to the house has every interest in allaying a fear of theft, to avoid the owner changing the house key. Consequently, he will arrange to "return" the command transmitter as rapidly as possible so it will be quickly found, leading it to be believed that it fell from the owner's pocket or got put somewhere else through absent-mindedness.

In the meantime, the burglar has obviously duplicated the confidential codes in a new command transmitter or at least one without any security key, which he obtained from some other source, putting himself in a position to come back, possibly several weeks after the facts when the owner is away. This risk should all the more be taken into consideration seeing that command transmitters operating on the same standard and using the same communication protocol are freely available.

There is consequently always a problem of security when all or part of confidential information is being transferred between bidirectional objects and costs are always involved in such transfer.

SUMMARY OF THE INVENTION

To solve this problem, the invention provides a method for transferring information between a first bidirectional command transmitter and a second bidirectional command transmitter, the method comprising the steps of:

establishing authentication between said first command transmitter and a third bidirectional object, and then, if authentication is successful transferring information from said first command transmitter to said second command transmitter, storing said information in said second command transmitter.

The third object may be a command receiver. The command receiver then is responsible for controling an actuator for an openable member such as a door or a blind.

The third object may also be a third command transmitter.

The method can further comprises a prior step in which said third object is designated, during which the third command transmitter issues a command that designates it as being a third object for the remaining command transmitters.

In one embodiment, during said transfer step, part of the information is transferred from the first command transmitter to the second command transmitter via said third object.

Alternatively, all the information can be transferred from the first command transmitter to the second command transmitter during the transfer step.

The method can further comprise a second authentication step. The second authentication step can consists in analysing biometric data of a user, or in analysing a manual action performed by the user, the analysis being for example performed within said third object.

The information that is transferred can be object configuration information such as a common key and/or bidirectional object identifier A communications network is also provided, comprising first and second bidirectional objects, such as a first and second command transmitter, a third bidirectional object, said second object being adapted to store information received via an information transfer method according to one of the preceding claims.

A bidirectional command transmitter is also provided, comprising an authentication routine with another bidirectional object and an information transfer routine to another bidirectional command transmitter, said transfer routine only being able to be implemented when said authentication routine has yielded a positive result. The information that is transferred can be object configuration information such as a common key and/or bidirectional object identifier.

The command transmitter can include a memory storing an identifier for the bidirectional object with which said authentication routine is performed.

Other features and advantages of the invention will become more clear from the detailed description that follows of some embodiments provided solely by way of example and with reference to be attached drawings.

BRIEF DESCRIPTION OF THE DRAWINGS

FIGS. 4 and 5 show variations in information transfer procedures.

DETAILED DESCRIPTION

We shall describe the invention below on the basis of an example applying to matching in home automation systems; the invention is not limited to such systems. We shall use below the terms "command transmitter" and "command receiver" to designate objects the function of which is to send or receive instructions given by a user; a command transmitter is also commonly called a control unit, while a command receiver is a sensor that controls an actuator for opening something, or operating for example a roller blind. These designations are not representative of "transmitter" or "receiver" functionalities which, from a signal point of view, are capable both of transmitting as well as receiving. This is why we can talk about "bidirectional objects" in other words objects able to transmit and receive. For the sake of clarity of explanation, we shall use the words "transmitter" or "receiver" but these only represent the specific purpose to which a given bidirectional object has been assigned.

A bidirectional object can involve an initialization step adapted to initialize transfer of information to other objects or certain ones of the latter, and an authentication step adapted to authenticate objects that come into contact with said object and a logic unit that runs the initialization and authentication stages. The object also comprises a memory containing the programs implemented in the logic unit and notably the object's operating programs. As explained below, an object's memory can also contain at least one common key; the object can also contain matching information, for example the identifiers of other objects stored in its memory.

Figure 1:
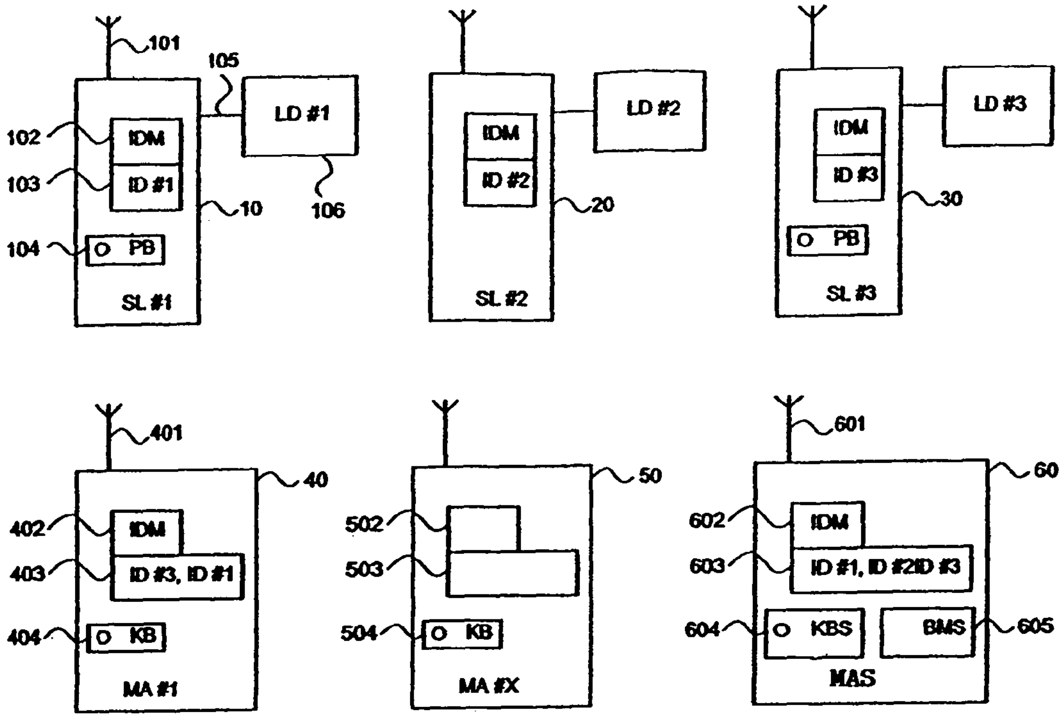
FIG. 1 shows a home automation network to which the invention is applied.

FIG. 1 shows a communications network such as a home automation network, in which the method can be implemented. The network comprises three command receivers or slave stations SL, already installed in the home automation network. Command receiver SL #1, designated by 10, contains a two-way radio communication means represented by an antenna 101 and connected to a processing logic unit of the microcontroller type of which we have, for the sake of simplicity, only shown two memory locations 102 and 103. The first memory location 102 contains the common key IDM, while the second memory location 103 contains identifier ID #1, specific to command receiver 10.

Command receiver 10 may also contain information inputting means 104. Such means are for example a push-button or end-of-travel switch, or yet again a proximity detector or another device the function of which in normal operation may differ from the function in a particular matching or programming mode. Not all command receivers of necessity contain the information inputting means 104. We shall see that it is also possible for all command receivers to contain these means.

Finally, command receiver 10 is designed to actuate a load 106 identified as LD #1, to which it is connected by a wire link 105 transmitting command instructions and/or the electrical power necessary for operating the load, such as a roller blind. The power source is not shown, nor are the electrical switching means making it possible to power the load.

Command receiver SL #2, designated by 20, is identical to the preceding one with the sole difference that it does not contain information inputting means. Further, receiver 20 has a different identifier ID #2, located at the second memory location. The first memory location contains the same common key IDM as command receiver SL #1. Command receiver SL #3, identified by 30, is identical to command receiver 10 except for the identifier which is ID #3.

On FIG. 1, we have also shown a first command transmitter MA #1, identified by reference numeral 40. Command transmitter 40 contains two-way radio communication means shown by an antenna 401, and is connected to a processing logic unit of the microcontroller type of which, for the sake of simplicity, only a third memory location 402 and a fourth memory location 403 are shown. Third memory location 402 contains a common key IDM while the 4th location 403 contains all the identifiers ID of the command receivers that respond to commands issued by command transmitter MAI #1.

By way of example, in this 4th memory location 403 we find identifiers ID #1 and ID #3, in other words command transmitter 40 is adapted to separately or simultaneously control the loads LD #1 and LD #3 via command receivers 10 and 30. Command transmitter 40 is, on the other hand, not programmed to operate on a load LD #2 via command receiver 20, as this command transmitter does not carry identifier ID #2 at location 403. This is clearly just an example of a configuration.

Command transmitter 40 may also contain means 404 for inputting commands, for example a keyboard KB linked to the microcontroller.

We have also shown a second command transmitter MA #X, reference numeral 50, of the same type as the first command transmitter. However, the first command transmitter 40 already belongs to the network whereas the second command transmitter 50 is a new device to be installed on the network. Also, the third memory location 502 and 4th memory location 503 are consequently empty.

For the purposes of describing the invention, we shall suppose that we require to give the second command transmitter identical rights to those of the first.

FIG. 1 finally shows an instruction transmitter of a particular type MAS, reference numeral 60. This command transmitter comprises, reference numerals 601-603, the same elements described in the previous command transmitters but has a special feature in that, preferably, it is not habitually used for issuing commands, but rather is kept in a safe place. This command transmitter contains the house key in a third memory location and preferably, in a fourth memory location it contains the identifiers of all the command receivers in order to act thereon if necessary. It can also advantageously contain a specific program making it possible to inhibit any re-initialization function from command receivers that was not issued by this special type of command transmitter, as disclosed in applicant's French patent application 02-14093.

To avoid this particular type of command transmitter getting mixed up with others, it has a specific shape. It can finally contain a specific keyboard 604 and/or a biometric recognition sensor 605.

Figure 2:
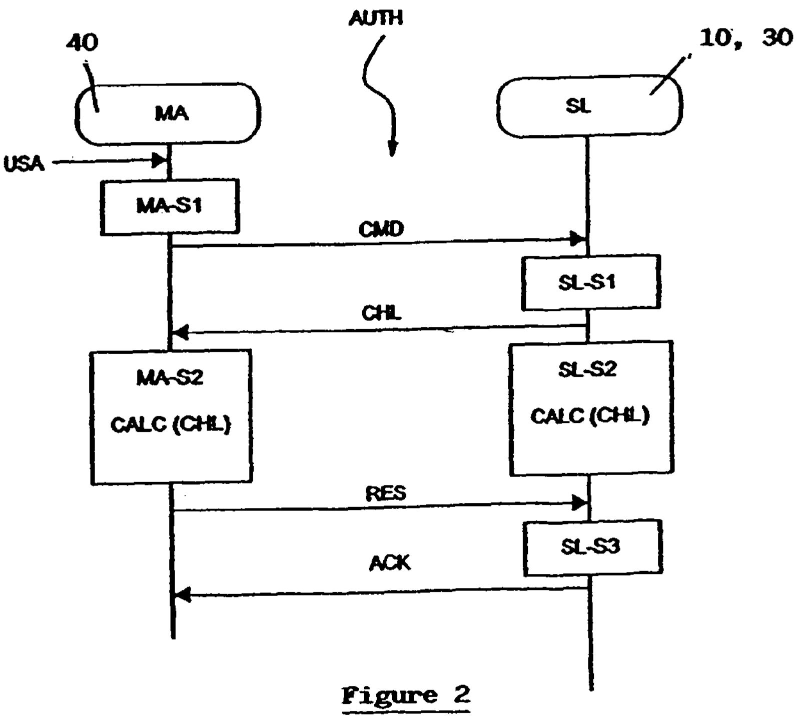
FIGS. 2 and 6 show two authentication procedures within this network.

FIG. 2 describes an authentication process AUTH employed in the communication network when a master unit MA or command transmitter 40 wants to have a command executed by a slave unit SL, or command receiver 10, 30 depending on the network consideration. The process can start after the user has performed an action USA on the command transmitter 40 keyboard, the result of which is issue of a command CMD at the end of initialization step MA-S1 on command transmitter 40.

Upon receiving this command, command receiver 10, 30 starts a first authentication step SL-S1 where it is determined whether the command to be executed requires authentication. If the answer is yes, receiver 10, 30 chooses a random number CHL that it sends to transmitter 40. Receiver 10, 30 then starts a calculation step SL-S2 of a result, employing a particular algorithm and random number CHL. The particular algorithm is derived from a general algorithm and the house key: it is consequently specific to all the elements belonging to the network. Via FIG. 2 it can be seen that command transmitter 40 is also able to receive signals and that command receiver 10, 30 is also able to issue signals.

In parallel, upon receiving random number CHL, transmitter 40 starts, in its turn, a calculation step MA-S2 for a result, using the same algorithm and the random number CHL, and the result RES is sent to receiver 10, 30 at the end of calculation step MAE-S2. Upon receiving result RES, the slave unit starts a comparison step SL-S3 RES with its own result. If the two results agree, an acknowledgement ACK is sent to transmitter 40, signifying successful authentication.

In an improved version, the process is repeated in the opposite direction so as to achieve cross-identification. The algorithm can also derive elements previously exchanged between command transmitter and command receiver and thus becomes specific to each pair involved.

Figure 6:
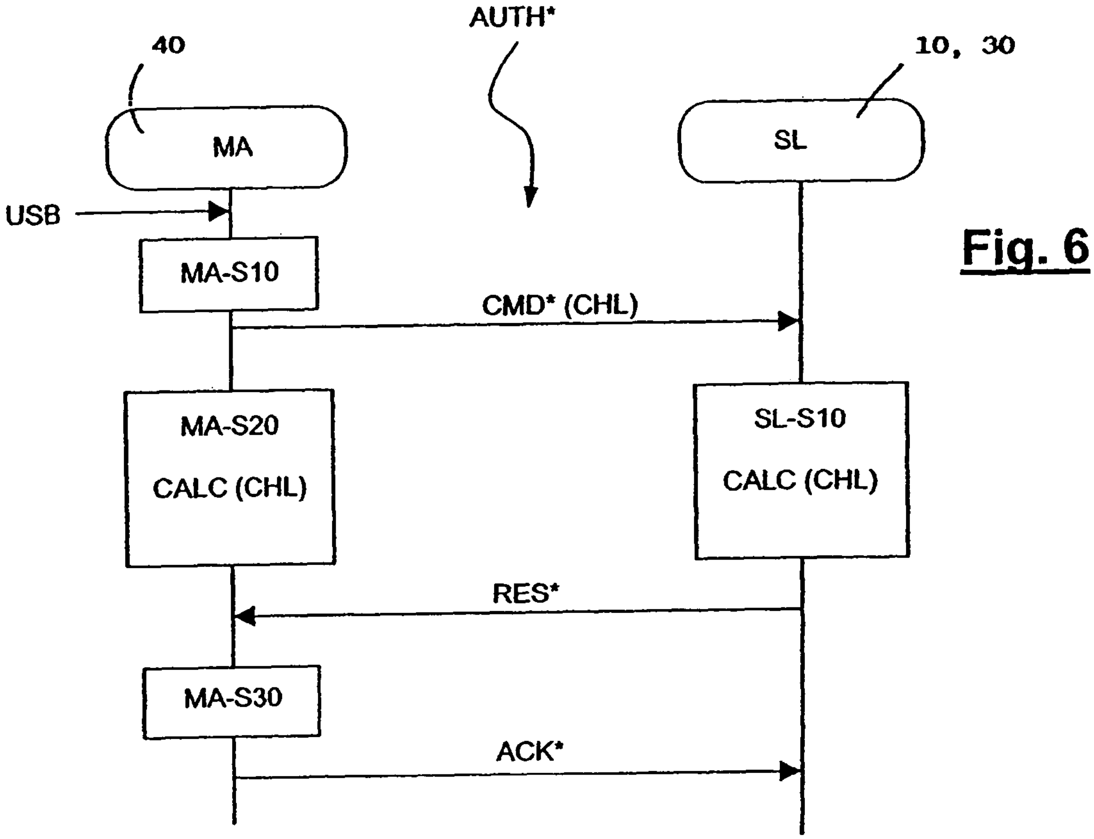

In certain circumstances, the authentication process may also only be performed in the reverse manner, in other words it is command transmitter 40 that asks command receiver 10, 30 to authenticate itself, as shown in FIG. 6, using the authentication process AUTH*. The process is symmetrical with the process shown in FIG. 2. The process can start following the user performing a USB action on the command transmitter 40 keyboard, the effect of which is to bring about sending of a command CMD* at the end of initialization step MA-S10 on command transmitter 40. In this case, the random number CHL can be transmitted in command CMD* requesting authentication. Transmitter 40 then starts a calculation step MA-S20 for the result using an algorithm and random number CHL. In parallel with this, upon receiving random number CHL, receiver 10, 30 starts, in its turn, a calculation step SL-S10 for a result, using the same particular algorithm and random number CHL, and the result RES* is sent to transmitter 40 at the end of calculation step SL-S10. Upon receiving the result RES*, the transmitter starts a comparison step MAE-S30 RES * using its own result. Where there is coincidence, an acknowledgement ACK* is sent to receiver 10, 30, signifying successful authentication.

The relatively elaborate authentication procedure has little bearing on understanding of the invention, the important thing being that this procedure does sufficiently guarantee the identity of the command transmitter and/or receiver.

Figure 3:
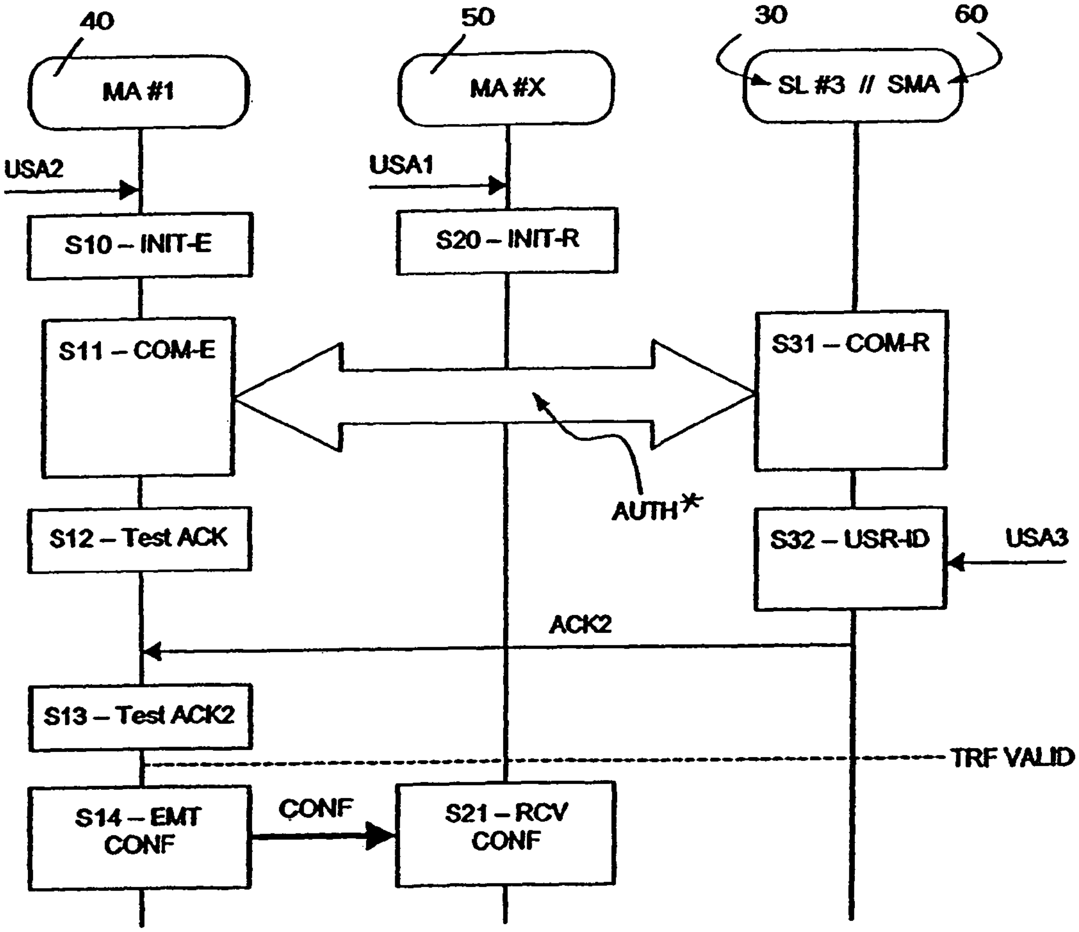
FIG. 3 shows an embodiment of the method of the invention.

FIG. 3 shows one embodiment of the procedure for transmitting information between the first command transmitter MAE #1 reference numeral 40 and the second command transmitter MA #X, reference numeral 50. The procedure involves the use of a third bidirectional object which is, depending on whether this is the first or second embodiment, a command receiver 30 or a command receiver 60 of the particular type. This third object is a third party requiring to be in the presence of an object of the network to perform transfer. This avoids, for example, transmitter 40 being temporarily taken away for transferring the information at a safe place after which transmitter 40 is returned. Information can consequently only be transferred in a particular context.

The remainder of the procedure will be explained with reference to command receiver 30 as the third party, corresponding to the first embodiment "alternative embodiment 1". Here, instruction receiver 30 is adapted to receive commands from command transmitter 40.

The process comprises a first authentication step between the first command transmitter 40 and the third bidirectional object 30 such as command receiver 30. This step is performed at S-11 by the first command transmitter 40 and at step S-31 by command receiver 30. This authentication step makes it possible to ensure command receiver 30 is present before information is transferred. This rules out the possibility of transferring information to a bidirectional object that is not authorized. The authentication step can be carried out as per the description accompanying FIG. 2. Preferably, reverse authentication AUTH * of FIG. 6 will be employed.

The procedure then comprises a configuration information CONF transfer step from first receiver 40 to the second object 50. During this step, confidential information concerning the configuration of transmitter 40 is transmitted to transmitter 50 to configure the latter. In FIG. 3, the transfer step is performed by first transmitter 40 at step S-14 by sending EMT and is performed by the second transmitter 50 at step S-21 with reception RCV. The information transfer step is only executed if the authentication step has been successful. Depending on the authentication process adopted, the authentication step is successful if the first command receiver 40 is authenticated or, in other words, if the first transmitter 40 has been identified and authorized to transfer the information it contains; preferably, the authentication step is successful if command receiver 30 is authenticated. Information transfer makes it possible for the information held by the first transmitter 40 to be communicated to the second transmitter 50. During this step, all or part of the information of the first transmitter 40 is transferred from the first transmitter 40 to the second transmitter 50. This obviates the need to go through a whole series of individual matching operations between the second transmitter 50 and the command receivers 10, 30 on the network which have already been matched with the first command transmitter 40. The transfer makes it possible to reproduce, in the second command transmitter 50, the programming that was performed on the first command transmitter 40. Command transmitter 50 consequently possesses the same access rights as those assigned to command transmitter 40.

Transfer can involve duplicating or copying information from one object to another. This is the case when several command transmitters are required which will control the network in identical fashion. The transfer of information from one command transmitter to another may also be involved, command transmitter 40 then losing the information transferred and command transmitter 50 becoming the only object able to control the network. This is the case when it is required to have a new command transmitter available, the former one becoming obsolete.

The information can be configuration information for objects on the network. The configuration information makes it possible to recognize the identity of objects (identifier ID ##) and to recognize whether objects belong to a given network (house key or common key IDM). The information transferred is confidential in the sense that it allows control of the network. The information allows for example things to be opened such as roller blinds or garage doors, which typically can give access to a house.

The procedure then comprises a step in which the information is stored in the second command transmitter 50. This step has the effect of making the second command transmitter 50 operational in the sense that it is now matched with command receivers 10, 30 with which the first command transmitter 40 was matched. On FIG. 1, storage is manifested by memory locations 502 and 503 being occupied by the information supplied by command transmitter 40. In our case, memory location 502 stores the house key IDM and memory location 503 stores identifiers ID #1 and ID #3, corresponding to receivers 10 and 30.

The procedure consequently makes it possible to transfer information from one command transmitter to another in a secure manner. This is advantageous when the user wishes to replace an old command transmitter by a new one as he can himself match the new command transmitter with receivers on the network in a simple manner. The user may also wish to transfer the information in order to match a second command transmitter, allowing two users to control the network. Transmission is at least cost, as the information is transmitted between objects by means already implemented in the object, i.e. by RF and not by implementation of supplementary means such as infra-red.

To improve the efficiency of this first embodiment "alternative embodiment 1" in which a command receiver is employed as a third party, it is preferable for the command receiver 30 to be unique, and provided inside the house. We can for example suppose that only one particular model of command receiver contains the information inputting means 104.

Nevertheless, to avoid having different product references and for preventing the particular command receiver being identifiable, all command receivers may be fitted with such means. In this case, a hardware or software procedure is employed for disenabling the means on command receivers that are accessible from outside the dwelling, or yet again one could disenable the means on all command receivers except one.

One can also avoid this disenabling procedure by registering, on each command transmitter belonging to the network, the identifier of that command receiver which will be employed as the third party. Registration can be done in a specific memory or, as in the case of FIG. 3, through having determined in advance that the first ID #3 of identifier ID #3 and ID #1 in a 4th memory 403 will be the one for the command receiver 30 employed as the third party. Thus, only one single command receiver is involved during transfer operations and the owner of the premises is the only person to know which, thereby enhancing transfer security. Registration of the specific command receiver identifier is for example handled as a matching operation, with special manipulation of the command transmitter keyboard.

We shall now describe the transmission procedure in more detail. In the embodiment of FIG. 3, the procedure starts with a first action on the part of the user USA1 on the second command transmitter 50 in order to start a secured reception initialization step S-20 by receiver 50. Action USA1 is for example performed via a specific key combination on keyboard 504. Similarly, a second action on the part of the user USA2 is performed on the first command transmitter 40, to initialize the transfer procedure to the second command transmitter 50, involving a step of secured transmission initialization S-10 by command transmitter 40. A first authentication step S-11 with command receiver 30 is then started. For command receiver 30, the first authentication step bears the reference S-31. A first acknowledgement signal ACK can then be sent by the command transmitter where authentication is successful; this signal can then be tested by the first command transmitter 40 during step S-12.

According to one embodiment, cross-authentication is employed. For this, not only the first command transmitter 40 is authenticated by command receiver 30, but also receiver 30 is authenticated by transmitter 40. This step ensures the presence and the identity of objects belonging to a network. This enhances transfer security.

Advantageously, the procedure also includes a second authentication step. Optionally, this second step is only implemented when the first authentication step has been successful. Indeed, it is advantageous to guarantee the presence of a particular command receiver while, in general, authentication is more specifically designed to validate the identity of a command transmitter. It is consequently possible that, for reasons of simplicity, the protocol employed does not include the reverse and/or cross-authentication functions. As a way of overcoming this shortcoming, and to ensure a supplementary degree of security, a second authentication process is provided for. This is shown at the second authentication step S-32, where a third user action USA3 is tested.

The second authentication step is, depending on the various embodiments, of varying degrees of sophistication. It can involve biometric analysis such as analysis of the user's fingerprint; it can involve analyzing a manual act performed by the user for example using the inputting means of command receiver 30, such as its push-button PB. These analyses are implemented in a simple manner. Preferably, the user operates on the third party object. This ensures that the user will physically act on the latter thereby preventing information transfer at a place where the third party object is not present. This contributes to enhancing security. Depending on the desired degree of security, a user's identification code can even be transmitted by the user using this means, but the simple fact of requiring simple action on a pre-defined command receiver already is sufficient to avoid the majority of the risks discussed above.

At the end of this second authentication step, a second acknowledgment signal ACK2 can be sent by command receiver 32 to the first command transmitter which, after having tested it during the second test step S-13, can declare a transfer valid if the second test is successful (reverse- or cross-authentication and -acknowledgement are possible).

At this stage, shown by a dash-dot horizontal line TRF VALID, the confidential configuration information transfer step can take place. Various embodiments can be envisaged for performing the transfer and storage steps. In a first embodiment shown below the TRF VALID line in FIG. 1, a configuration transmission step S-14 is initiated by the first command transmitter 40 which transfers, in the form of a CONF message, confidential information stored in the first 402 and second 403 memories. This information is then stored by the second command transmitter 50 during the configuration reception step S-21. In this first alternative embodiment, all the information is transferred directly from command transmitter 40 to command transmitter 50. The information is not transmitted via the third object 30, 60. This avoids the need to program a third object so that it can participate in the actual transfer of information. This embodiment is a simple manner of transferring and storing the information.

FIGS. 4 and 5 show second and third alternative embodiment of information transfer and storage. In FIGS. 4 and 5, the three objects 30, 40, 50, 60 are shown with the dotted line TRF VALID indicating that the whole procedure of FIG. 3 is identical up to this line, and varies after it.

FIG. 4 shows a second alternative embodiment in which the command receiver 30 that acted as a third party also plays the role of an intermediate station for all the information to be transferred to command transmitter 50. A configuration transmission step S-15 is initiated by the first command transmitter 40 which transfers, in the form of a CONF message, the confidential information present in its first 402 and second 403 memories. This alternative embodiment is characterized by the fact that receiver 30 receives all information, this occurring at step S-33. A configuration transmission step S-34 is then initiated by command receiver 30 in the form of a CONF message, to again transfer the information to the command transmitter 50. This information is then stored by the second command transmitter 50 during the configuration reception step S-22. The advantage of this alternative embodiment is that it enhances the security of the transmission procedure since both the transfer and storage steps must be performed in the presence of the third object, which rules out of the command transmitter 40 being temporally removed from the house in order to transfer and store its information.

FIG. 5 shows a second alternative embodiment in which the command receiver 30 that acted as a third party also plays the role of an intermediate station for part of the information to be transferred to the command transmitter 50. A transmission step S-16 is initiated by the first command transmitter 40 which only transfers part of the information. In the example of FIG. 5, this is information concerning the identifiers of the command receivers 10, 30 with which command transmitter 40 is matched. The information concerning the identifiers is then stored by the second command transmitter 50 during the configuration reception step S-23. Further, a transmission step S-35 is initiated by the third object 30 which only transfers the other part of the information. In the example of FIG. 5, this is information concerning the house key IDM. Information concerning the house key IDM is then stored by the second command transmitter 50 during the configuration and reception step S-24. Clearly, it is possible to reverse the information transferred by the first command transmitter 40 and by a third object 30. The advantage of this embodiment is that it is secure and simple since, firstly, the transfer and storage steps must be performed in the presence of the third object and, secondly, each one of command transmitter 40 and object 30 simply transfers the information present at one of its memory locations.

The second embodiment "alternative embodiment 2" of the procedure consists in adopting a command transmitter as the third party. It is completely possible to take a standard type of command transmitter in other words identical to the first or second command transmitter but, preferably, a specific command transmitter MAS as described above is adopted; this is shown in FIG. 1 by reference numeral 16.

The procedure is similar to that described with reference to FIGS. 3, 4, 5 but in "alternative embodiment 2" the command transmitter of the particular MAS type acts as a third party. Apart from this, the steps in the procedure are strictly identical to those of the first embodiment.

One advantage of choosing a command transmitter of the particular type is that it avoids having to provide information inputting means on the command receivers, and, generally speaking, it avoids creating an overall cost overhead for the command receivers by optionally adding means allowing a second authentication.

Since a the command transmitter of the particular type MAS is, in principle, unique in the installation, it can include sophisticated elements such as a special keyboard KBS having a greater number of keys than a normal command transmitter, which facilitates the user entering a confidential code, and/or it may include a biometric recognition sensor thereby guaranteeing high security of use.

The use of a command transmitter of the particular type can be implemented after the installation has already been operating in non-secured mode. For example, command transmitters are normally able to be duplicated as in the prior art up to the point where they receive a particular command which can only be issued by a transmitter of the particular type and which will be ignored by the command transmitters of the installation except where the command transmitter of the particular type contains the common key. Upon receiving this particular command, the command transmitters of the installation cease to be able to be duplicated, and become able to be duplicated according to the second alternative embodiment of the invention, the third party being the command transmitter of the particular type which issued the said particular command.

Where a command transmitter of the particular type MAS is employed, it can also be envisaged for the procedure to comprise a prior step in which a third object is designated.

During this step, the third command transmitter 60 of the particular type sends a command which designates it as the third object for the other command transmitters 40, 50. This step is particularly advantageous where a command transmitter of the particular type is put into service after the installation has already been operating in a non-secured manner. In this case, the identifier of the third command transmitter is registered in a specific memory or as first identifier stored in the 4th memory 403 of each command transmitter already belonging to the network. It can also be envisaged for the object that acts as the third party to be a "universal" object; this can for example be a programming bidirectional object which is possessed by the seller or the installer, allowing the information transfer procedure to be implemented. Nevertheless, this object is in no case available commercially.

The invention also covers the above communications network comprising the above bidirectional objects, two of the objects being able to be command transmitters. In this network, the information of one of the transmitters can be transferred to the other, with a third object intervening, as described above. One of the command transmitters stores the information received. Transfer is in secured mode within the network.

The invention also covers a bidirectional command transmitter such as transmitter 40. The transmitter may include an information transfer initialization routine. Through this, the object is put into a position to carry out the procedure discussed above. The transmitter comprises an authentication routine with another bidirectional object, allowing the presence and identity of objects participating in the transfer procedure to be checked. Said other object is the third party previously described, which can be a command transmitter or receiver. The transmitter also comprises an information transfer routine to another bidirectional command transmitter, the transfer routine only being able to be implemented when the authentication routine has succeeded or gave a positive result. Further, command transmitter 40 may include a memory 403 that stores an identifier for the bidirectional object with which the authentication routine is implemented.

The transmitter is in particular provided for transmitting information such as a common key or bidirectional object identifier uniquely following the procedure discussed. Further, the routines described above can be part of an operating program for the command transmitter 40.

Obviously, this invention is not limited to the embodiments given above. We have only taken radio transmission between a transmitter and receiver as an example, and this can be modified. The invention applies notably regardless of whether the transmitters and receivers employ a single frequency or each transmit at their own frequency, or employ frequency hopping or with different modulations. The procedure applies whenever the command transmitters or receivers are "bidirectional objects" capable of transmitting and receiving.

One can clearly encode or encrypt the messages or identifiers, using techniques known in the art.

Specific embodiments of method for transmitting information between bidirectional objects according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for transferring on a home automation network at least a house key between a first bidirectional command transmitter already belonging to the home automation network and a second bidirectional command transmitter to be installed on the home automation network, the method comprising the steps of:

establishing authentication between said first bidirectional command transmitter and a third bidirectional object, by communicating on the home automation network and by using an authentication process employed in the home automation network when a command transmitter wants a command be executed by a command receiver designed to actuate an openable member, the authentication process including using a particular algorithm derived from a general algorithm and from the house key, and then, if authentication is successful;

transferring, by communication on the home automation network, the house key from said first bidirectional command transmitter to said second bidirectional command transmitter, storing said house key in said second bidirectional command transmitter; wherein the third bidirectional object is a command receiver designed to actuate an openable member when no command transmitter of a particular type contains the house key, or a command transmitter of a particular type which contains the house key.

2. The method according to claim 1 wherein the method further comprises a prior step in which said third bidirectional object is designated, during which the command transmitter of a particular type issues a command that designates it as being a third bidirectional object for the remaining command transmitters.

3. The method according to claim 1, wherein during said transfer step, matching information that includes the identifiers of other objects contained in the memory of the first bidirectional command transmitter is also transferred from the first bidirectional command transmitter to the second bidirectional command transmitter.

4. The method according to claim 1, wherein the method further comprises a second authentication step.

5. The method according to claim 4, wherein the second authentication step includes analyzing biometric data of a user.

6. The method according to claim 4, wherein said second authentication step includes analyzing a manual action performed by the user.

7. The method according to one of the two preceding claims, wherein said analysis is performed within said third bidirectional object.

8. The method according to claim 1, wherein upon receiving the command, the third bidirectional object starts authentication comprising:

calculation of a first result based on a random number;

sending the random number to said first command transmitter for calculation of a second result by said first command transmitter; and if the two results agree, sending an acknowledgement to said first command transmitter, signifying successful authentication.

9. The method according to claim 1, wherein the authentication process includes:

the first bidirectional command transmitter calculating a first result based on a random number;

the first bidirectional command transmitter sending the random number to said third bidirectional object for calculation of a second result by said third bidirectional object; and if the two results agree, sending an acknowledgement to said third bidirectional object signifying successful authentication.

10. The method of claim 1, further comprising the step of sending an information to the first command transmitter signifying successful authentication.

11. A bidirectional command transmitter, comprising two-way radio communication means in a home automation network and comprising an authentication routine to be used when the bidirectional command transmitter wants to have a command be executed by a command receiver designed to actuate an openable member, the authentication routine including a particular algorithm derived from a general algorithm and from a house key, the bidirectional command transmitter comprising:

a first memory location that contains the house key;

a second memory location that contains identifiers that respond to commands issued by the bidirectional command transmitter; and a third memory location including the identifier of a bidirectional command transmitter of a particular type, wherein the bidirectional command transmitter includes a transfer routine such that at least the house key can be transferred to another bidirectional command transmitter with the communication means only after a positive result of activating the authentication routine with the bidirectional command transmitter of a particular type.

* * * * *